US007532339B1

(12) United States Patent
Beard et al.

(10) Patent No.: US 7,532,339 B1
(45) Date of Patent: \*May 12, 2009

(54) SELF-DESCRIBING DEVICE INTERFACE SYSTEM

(75) Inventors: Eric Andrew Beard, Lexington, KY (US); Robert Jerome Borchers, Florence, KY (US); Evan Glenn Goldey, Lexington, KY (US); Craig Anthony Rudolph, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/456,652

(22) Filed: Dec. 8, 1999

(51) Int. Cl.
*G06F 3/12* (2006.01)
*G06K 15/02* (2006.01)

(52) U.S. Cl. ........................ 358/1.15; 358/1.13; 358/1.1

(58) Field of Classification Search .................. 358/1.1, 358/1.5, 1.12, 1.13, 1.14, 1.15, 1.16, 1.17, 358/1.18
See application file for complete search history.

(56) References Cited

U.S. PATENT DOCUMENTS

| | | | | |
|---|---|---|---|---|
| 4,965,771 A | * | 10/1990 | Morikawa et al. | 358/1.13 |
| 5,323,393 A | | 6/1994 | Barrett et al. | |
| 5,390,004 A | | 2/1995 | Hopkins | |
| 5,694,618 A | | 12/1997 | Hibino | |
| 5,699,494 A | | 12/1997 | Colbert et al. | |
| 5,727,135 A | | 3/1998 | Webb et al. | |
| 5,760,812 A | | 6/1998 | Hopkins | |
| 5,845,058 A | * | 12/1998 | Shaw et al. | 358/1.15 |
| 5,883,722 A | * | 3/1999 | Baumler | 358/296 |
| 6,148,346 A | * | 11/2000 | Hanson | 719/321 |
| 6,295,538 B1 | * | 9/2001 | Cooper et al. | 707/104.1 |
| 6,348,971 B2 | * | 2/2002 | Owa et al. | 358/1.15 |
| 6,498,611 B1 | * | 12/2002 | Beard et al. | 715/752 |
| 6,498,657 B1 | * | 12/2002 | Kuntz et al. | 358/1.15 |
| 6,615,297 B1 | * | 9/2003 | Beard et al. | 710/62 |
| 6,798,530 B1 | * | 9/2004 | Buckley et al. | 358/1.13 |
| 6,857,000 B2 | * | 2/2005 | Hattori et al. | 707/103 R |
| 6,996,566 B1 | * | 2/2006 | George et al. | 707/100 |
| 7,130,863 B2 | * | 10/2006 | Diab | 707/103 R |
| 7,256,901 B2 | * | 8/2007 | Ferlitsch | 358/1.13 |
| 7,266,565 B2 | * | 9/2007 | Diab | 707/102 |

\* cited by examiner

*Primary Examiner*—Twyler L Haskins
*Assistant Examiner*—Myles D Robinson
(74) *Attorney, Agent, or Firm*—Grossman, Tucker, Perreault & Pfleger, PLLC

(57) ABSTRACT

An interface is provided between two or more self-describing devices, each having a data store, or two ongoing processes on the same device sharing a common data store. The interface includes a datastream having at least one metavariable that is indicative of at least two or more parameters associated with a device. The datastream occurs between the data store of one transmitting device to the data store or one or more receiving devices or between two or more processes that may or may not share a common data store. The metavariable references or implies a number of other variables and allows devices to effectively communication without knowledge of the underlying variables. The metavariable can be data indicative of the configuration and settings of a device or can be a command altering two or more setting of a device upon receipt of the metavariable by the device. The metavariable also allows the abstraction of commands encompassing two or more variables such that function and conceptual settings can be communicated in one metavariable.

29 Claims, 5 Drawing Sheets

SAMPLE

| META_VARIABLE | SETTING#1 | SETTING#2 | – | SETTING#n |
|---|---|---|---|---|
| META_SETTING#1 | SETTING#1_VALUEa | SETTING#2_VALUEd | | SETTING#n_VALUEx |
| META_SETTING#2 | SETTING#1_VALUEc | SETTING#2_VALUEe | | SETTING#n_VALUEz |
| META_SETTING#3 | SETTING#1_VALUEb | SETTING#2_VALUEf | | SETTING#n_VALUEy |
| END OF TABLE MARKER | EOT MARKER | EOT MARKER | – | EOT MARKER |

OPTRA COLOR C710

| NVMETA_PRNTQUALITY | NPA_NVRESOLUTIONX | NPA_NVRESOLUTIONY |
|---|---|---|
| NVMETA_PQ600DPI | NV600DPI | NV600DPI |
| NVMETA_PQ1200QUALITY | NV1200DPI | NV1200DPI |
| −1 | −1 | −1 |

OPTRA W810

| NVMETA_PRNTQUALITY | NPA_NVRESOLUTIONX | NPA_NVRESOLUTIONY | NPA_NVIET |
|---|---|---|---|
| NVMETA_PQ1200IMAGEQ | NV600DPI | NV600DPI | NV_ON |
| −1 | −1 | −1 | −1 |

OPTRA_T*

| NVMETA_PRNTQUALITY | NPA_NVRESOLUTIONX | NPA_NVRESOLUTIONY | NPA_NVIET |
|---|---|---|---|
| NVMETA_PQ1200IMAGEQ | NV600DPI | NV600DPI | NV_ON |
| NVMETA_PQ1200QUALITY | NV1200DPI | NV1200DPI | NV_OFF |
| NVMETA_PQ1200QUALITY | NV1200DPI | NV1200DPI | SPLAT |
| −1 | −1 | −1 | −1 |

SAMPLE

| META_VARIABLE | SETTING #1 | SETTING #2 | ... | SETTING #n |
|---|---|---|---|---|
| META_SETTING #1 | SETTING#1_VALUEa | SETTING#2_VALUEd | — | SETTING#n_VALUEx |
| META_SETTING #2 | SETTING#1_VALUEc | SETTING#2_VALUEe | — | SETTING#n_VALUEz |
| META_SETTING #3 | SETTING#1_VALUEb | SETTING#2_VALUEf | — | SETTING#n_VALUEy |
| END OF TABLE MARKER | EOT MARKER | EOT MARKER | — | EOT MARKER |

OPTRA COLOR C710

| NVMETA_PRNTQUALITY | NPA_NVRESOLUTIONX | NPA_NVRESOLUTIONY |
|---|---|---|
| NVMETA_PQ600DPI | NV600DPI | NV600DPI |
| NVMETA_PQ1200QUALITY | NV1200DPI | NV1200DPI |
| −1 | −1 | −1 |

OPTRA W810

| NVMETA_PRNTQUALITY | NPA_NVRESOLUTIONX | NPA_NVRESOLUTIONY | NPA_NVIET |
|---|---|---|---|
| NVMETA_PQ1200IMAGEQ | NV600DPI | NV600DPI | NV_ON |
| NVMETA_PQ1200QUALITY | NV1200DPI | NV1200DPI | −1 |
| −1 | −1 | −1 | |

OPTRA T*

| NVMETA_PRNTQUALITY | NPA_NVRESOLUTIONX | NPA_NVRESOLUTIONY | NPA_NVIET |
|---|---|---|---|
| NVMETA_PQ1200IMAGEQ | NV600DPI | NV600DPI | NV_ON |
| NVMETA_PQ1200QUALITY | NV1200DPI | NV1200DPI | NV_OFF |
| −1 | −1 | −1 | SPLAT |
| | | | −1 |

FIG.1

SELF-DESCRIBING DEVICE INTERFACE SYSTEM

BACKGROUND OF THE INVENTION

1. Field of the Invention

The present invention generally relates to computer interface systems. More particularly, the present invention relates to computers in a communication interface that transmit self-descriptive information.

2. Description of the Related Art

Computers and common peripheral devices such as modems, printers, and displays are connected in communication such that a computer, generally referred to as the host, can send data and receive data from the peripheral devices and other computers. The communication channel between the computer(s) and devices may be either unidirectional, such that one computer or peripheral device only sends or only receives data to another, or bidirectional, with each device both sending and receiving data. In such a scenario, one computer or peripheral device can serve either single or multiple hosts, which is often dependent upon the manner of connection of the devices.

A typical device-host connection is a cable connected directly to the serial or parallel port of both the host and the peripheral device such that the peripheral device primarily serves the connected host. Alternatively, a computer and peripheral device are connected in a network and each device is accessible to and can interface with multiple hosts residing on that network. In order to properly interface, the computer(s) and peripheral device(s) must have a known data protocol between them whereby each device can understand the data from one another.

The interface protocol is particularly important in host-peripheral device applications in which the host is controlling the peripheral device to perform a function. The data passed from the host to the peripheral must be very specific in the desired function, and often, the peripheral device will communicate with the host to inform the host of the properties and functions of the peripheral device. An example of such interface is that between a computer as the host device and a printer as the peripheral device through a known protocol such as the Network Printer Alliance Protocol (NPAP).

A printer has numerous setting capabilities, a few examples being paper size, font, and paper type, which are often changed for every single print job requested by a host computer. Furthermore, prior art printers have the capability to send data back to the host computer indicative of various parameters of the printer, such as job in progress, paper jam, paper tray status, and printing errors. Thus, when the computer and printer are interfaced, they pass the above data regarding the print jobs and printer status through data variables that reflect the attributes of one parameter. And when the attributes of printing parameter are desired to be changed, the computer sends specific variables to the printer and each variable changes one parameter of the printer. Given the significant number of parameters for the printer and the specific control desired by the host computer, several problems are recurrent in the host computer-peripheral device interface.

The host computer and peripheral device can be unaware of the all of the variables for different parameters of the other devices, such as the variables for specific printer settings and capabilities, or the inter-relationship between different variables and their related parameters and functions. Accordingly, when a printer attempts to provide this "self-descriptive" data, such as configuration data, to a host computer, or when the host computer attempts to change several settings in the printer, the variables utilized may not effectively communicate all parameters of the devices. Because of this inadequate communication between interfaced devices in prior art systems, hosts and peripheral devices have been unable to easily provide conceptual settings to a user, such as "print quality" or "page layout."

Moreover, either the host or the peripheral device may need to update many variable settings on their underlying hardware for proper functioning, especially through upgrades and changes in software. To correctly update the variables, the host must have advance knowledge of the variables and their interdependence to even allow the user to change the variables. Further, other problems can occur because subsequent code releases in the device tend to change those interdependencies by changing the settings of the individual variables or adding new dependencies. Even though the device may be aware of the new interdependencies, if the dependencies are not easily stored and communicated to other systems in the device, confusion and extra development time may result as those variables are changed.

Accordingly, to function properly as a complete interface system, the capability to understand the interdependencies between variables must exist at both the host and the device. Furthermore, the variable relationships frequently change and if one device were not properly updated, the system would fail. The prior art systems thus provide an unsatisfactory interface between host computers and peripheral devices, and particularly host computers and printers, as complex self-descriptive data and commands with variables is limited and prone to error. A system that allows improved self-description would therefore represent an improvement over the prior art computer-peripheral device interfaces. It is to the provision of such an improved interface system that the present invention is primarily directed.

SUMMARY OF THE INVENTION

The present invention is an improved interface system between two or more devices having a data store, such as a host computer and a printer. Each device is in communication with one or more of the other interfaced devices, either directly or through a network such as the Internet. The interface includes a datastream having at least one metavariable, where the metavariable is indicative of at least two or more parameters of a device. The datastream occurs between the data store of one transmitting device to the data store of one or more receiving devices. The interface is also applicable to two or more processes on one device that are in communication with each other.

The metavariable is data indicative of the configuration and settings of the transmitting device or process, such as the settings of a printer. The metavariable is alternately data indicative of the configuration and settings of the receiving device or process. In either of these embodiments, the metavariable can transmit self-descriptive data. Conversely, the metavariable is a command preferably altering two or more settings of the receiving device upon receipt of the metavariable by the receiving device, such as a command to a printer to change print quality which causes several parameter changes. The metavariable can likewise be data indicative of two or more application settings of the transmitting device or the receiving device. Therefore, the metavariable gives the device the ability to state in one variable the parameters of its configuration, or the parameters relative to its particular application, through the interface between the devices. When the metavariable is transmitted and received on the same device, it can reflect either one or more parameters of a process, or one or more parameters or settings of the device.

The preferred interface is between one or more computers and one or more printers where each computer and each printer have a data store, and alternately, a processor. An example of a metavariable command in this interface would be a metavariable command from the host computer to the printer changing two or more settings of the printer. And an example of the metavariable containing self-descriptive data of the transmitting device is the printer transmitting a metavariable indicative of the printer settings to one or more receiving host computers.

The present invention includes the inventive element of the metavariable for use in an interface between two or more devices or two or more processes of the same device. As stated above, the metavariable is indicative of at least two or more parameters of a device and contains data cumulative of variables for each parameter. As stated above, the metavariable can be data indicative of the configuration and settings of a device, such as the printer settings. And the metavariable is alternately a command altering two or more settings of a device upon receipt of the metavariable by the device, such as a "change settings" command sent from a host computer to a printer.

The present inventive interface and metavariable thus provide an inventive method of communication between two or more devices having a data store and a processor where each device is in a communication interface with one or more of the other devices, or between two or more processes on the same device. The method includes the steps of generating a metavariable in a transmitting device or process where the metavariable indicative of at least two or more parameters of a device, and transmitting the metavariable to one or more other receiving devices or processes through the communication interface, where the metavariable is indicative or two or more parameters of either the transmitting device or process, or the receiving device or process. The method then includes the steps of receiving the metavariable at a receiving device or process, and processing the metavariable in the receiving device or process for evaluation of action required in response to receipt of the metavariable.

The present invention therefore provides a commercial advantage in creating the concept of the metavariable as the device is able to provide a mechanism that allows the host and the peripheral device to easily represent complicated settings through abstraction. These settings can be a single real concept, such as page setup, which may require changing multiple variables in the device to allow the underlying hardware to function properly. The metavariable can alternately be a complex, abstract conceptual setting that varies from device to device, and the underlying variables for the setting may change within the device itself. Thus, the metavariable is able to relay the exact changes required or current configuration without communicating every variable that comprises the change or configuration.

The present invention further has industrial applicability in that where devices in an interface previously required complex logic to process a data stream that includes variables for each setting, the metavariable allows implementation of simple tables of variables associated with the metavariable. Thus, the individual variables can be changed and transmission of the metavariable still accomplishes valid communication between devices and systems and control thereover.

Other objects, features, and advantages of the present invention will become apparent after review of the hereinafter set forth Brief Description of the Drawings, Detailed Description of the Invention, and the Claims.

BRIEF DESCRIPTION OF THE DRAWINGS

FIG. 1 is an exemplary list of variable values used to implement metavariables for describing "PRINT QUALITY" in different printers.

DETAILED DESCRIPTION OF THE INVENTION

Figure 2:
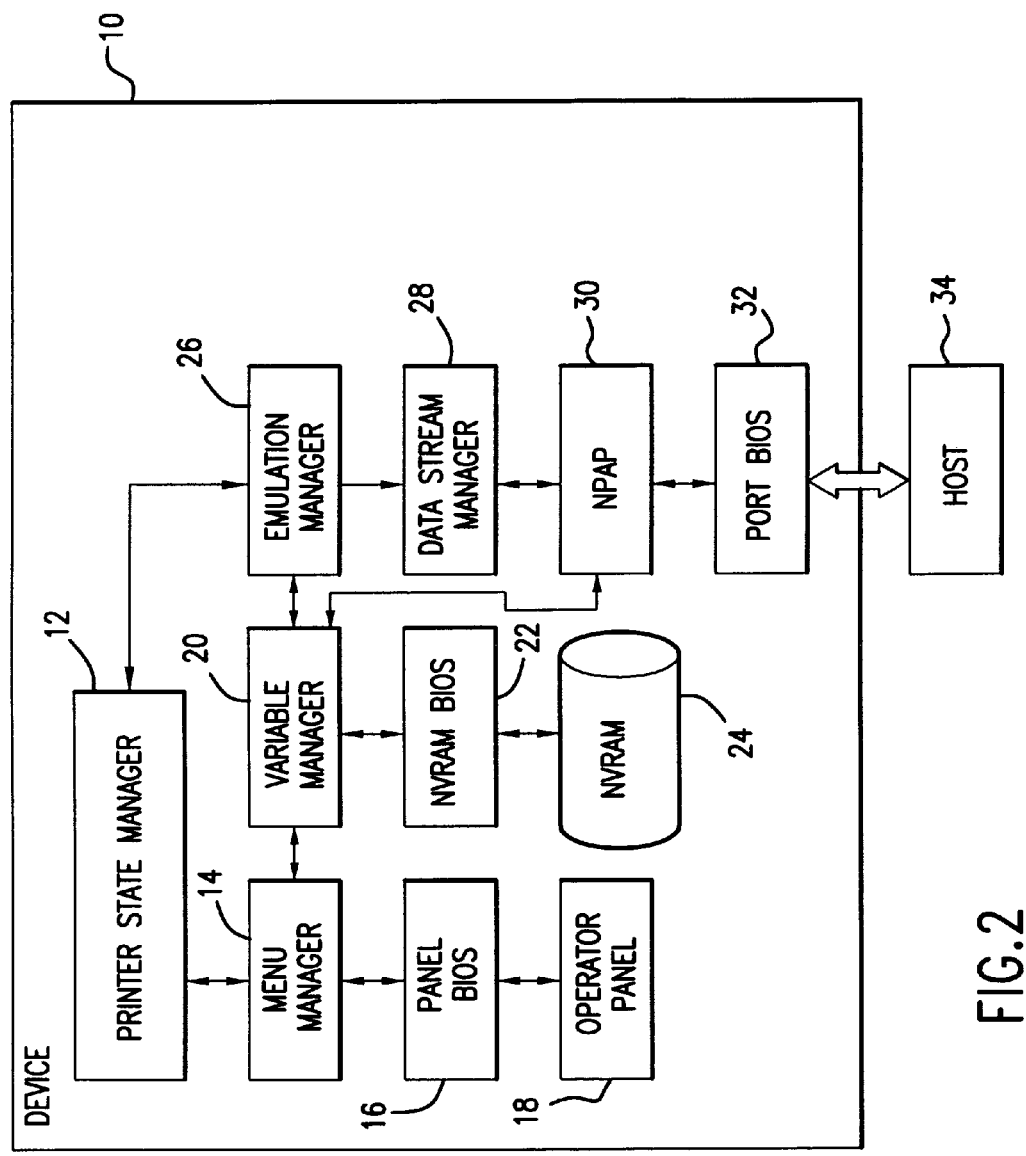
FIG. 2 is a block diagram of the various components within the device.

Referring now to the drawings in which like numerals represent like components throughout the several views, FIG. 1 illustrates a metavariable table that describes metavariables for use in an interface between a host computer and a printer. The present inventive metavariable is alternately used with two or more devices other than a host computer and printer, and can be used among traditional peripheral devices, such as printers, storage devices, and monitors. Each device within the interface communicates self-descriptive information, examples being settings, capabilities, or device and component type, and each metavariable is indicative of at least two or more parameters associated with the device. The metavariable can thus imply one or more existing variables of the device that already govern the parameters of the device.

In one embodiment, the metavariable is data indicative of the configuration and settings of a device, such as the META_VARIABLE settings illustrated in the sample table of FIG. 1. For every META_SETTING, there will be two or more variable settings indicated such that SETTING#1_VALUEa ... SETTING#n_VALUEx. Accordingly, the metavariable is alternately a command altering two or more settings of a device upon receipt of the metavariable by the device, such as the metavariables for print quality adjusting the print quality of the individual printer upon the receipt of the metavariable by the printer. Additionally, the metavariable can be data indicative of two or more application settings of a device, an example being the variables required to perform a specific print job.

Since the metavariable can affect one or more related variables for the specific device, the variables and settings for those variables needed to be properly referenced for each metavariable. Thus, FIG. 1 shows metavariables that include the term "META" which are implemented on the command menus of Lexmark printers Optra Color C710, Optra W180, and Optra T*. It is shown that the settings (and every variable involved) for PRINT QUALITY change from printer to printer, however, the NVMETA metavariable can indicate or reference the variables for print quality regardless of the actual syntax of the individual variables. As an example, for the Optra W180, the metavariable NVMETA_PQ1200IMAGEQ references or implies the variable NV600DPI for the beginning and ending resolutions and NV_ON for the NV_NVIET function.

As shown in the table for the Optra T*, the 'SPLAT' concept is used when the setting of an individual variable does not matter for the particular metavariable. Because the table is searched in order, the SPLAT case can be used to ensure a setting is returned for the metavariable when the printer gets into an ill-defined state.

The tables of FIG. 1 are preferred to be resident in the data store of the each interfaced device. However, the table can alternatively be solely in the data store of one device, such as a host computer, and another device, such as a printer, can access the table though the interface and copy the table to a local memory. Further, the actual variables implied by the metavariable(s) can be wholly derived from the actual variables that comprise the metavariable at the initialization of the system. This removes the necessity of storing metavariables in the actual storage media, such as NVRAM, thus conserving a scarce resource.

The consolidation of variables into a metavariable gives a developer the ability to easily create new variables or new concepts, and add new settings to existing variables that can be referenced by a single metavariable to ensure that the settings for implementation of the metavariable are correct. And because the variable manager provides a consistent interface through which to read and write variables with the simpler metavariable, the rest of the device interface system can easily determine the configuration or value/state of the device for even a complicated machine state.

The device interface system accordingly treats each metavariable as a single, simple variable or setting in transmission and interpretation. The menu manager code for each device preferably displays text for each metavariable just as it would for each regular variable, and host programs can therefore request the settings for a metavariable to either learn of the state of the machine or implement a metavariable command. However, the metavariable does not require selection of a menu node because the metavariable can only change settings in the device, and generally each setting has an individual variable that can be altered separately from the metavariable. However, when a menu node is selected, the device may need to update a file in addition to altering the variables in memory. This ability allows the individual settings for variables referenced by the metavariable to vary from device to device with an update occurring at the time of receipt of the metavariable.

It can be seen that the metavariable allows several levels of abstraction of device communication across an interface. The metavariable can be a single real concept such as the print quality being 300 dots per inch (DPI), which requires referencing multiple variables in the device to permit use of the metavariable as a command to correctly change the underlying hardware to function properly.

The metavariable can alternately be a complex, abstract conceptual setting such as "Conserve Resources." The conceptual setting of 'Conserve Resources' necessarily varies from device to device; on a laser printer it might mean: duplex, 2-up, and toner-saver mode; and on a computer it might mean: sleep after 10 minutes of inactivity. The metavariable consequently gives the developer the ability to create an intuitive command hierarchy of metavariables that are simpler to understand in function without full knowledge of the individual variables.

Moreover, the name or concept represented by a given metavariable controlling two or more variables in one device can control or affect a single native variable in a different device, or a variable for a specific parameter of that device, which allows for cross-device compatibility. A metavariable can thus imply only one native variable when received by the device, but that native variable will vary from device to device, and can be one native variable in one device and several native variables on another device.

Furthermore, while multiple metavariables can control a single native variable, each metavariable can have different properties. For example, the concept of "image enhancement" controls various image manipulations that are performed in a printer on a page. Some printers utilize processes or tasks that allow the user to be able to change this setting, while another printer provides the capability to report the image enhancement settings current value to the user. Consequently, the underlying variables for the metavariable affecting image enhancement can alter many device settings in one device, and simply generate a report in another device, which is typically accomplished by one variable.

FIG. 2 illustrates a block diagram for the interrelation of the various components within the device 10, which is shown here as a printer. The printer state manager 12 is in communication with the menu manager 14 and the emulation manager 26 to control the menu manager 14. The menu manager receives data from the panel BIOS 16 for the printer, which receives and send data to the operator panel 18 for display to a user and allows the user to input commands back to the menu manager 14. The menu manager 14 is in communication with a variable manager 20 that interprets variables for transmission, and those received from the host 34 through the NPAP interface 30, NPAP being the "Network Printer Alliance Protocol" that is a published protocol for host computer-printer communication. The variable manager 20 interacts through NVRAM BIOS 22 with the NVRAM 24 of the device 10 to have access to a menu of variables such as that illustrated in FIG. 1. The NVRAM 24 thus comprises a data store that can receive and store metavariable data for updating as well as provide the variable manager 20 with the metavariable and/or referenced variables for the menu manager 14 and ultimately the printer state manager 12. The data store is alternately embodied as ROM, RAM, Hard or floppy disk, volatile or non-volatile memory, or any sufficient resource known in the art to send or receive data.

The variable manager is likewise in communication with the emulation manager 26 to transmit data through the data stream manager 28. The data stream manger 28 uses the NPAP interface 30 to communicate across the device interface which includes the port BIOS 32 and the network or direct connection to the host 34. The NPAP interface 30 is one embodiment of the communication protocol and other computer languages and protocols are alternately used between the devices in the interface system.

Figure 3:
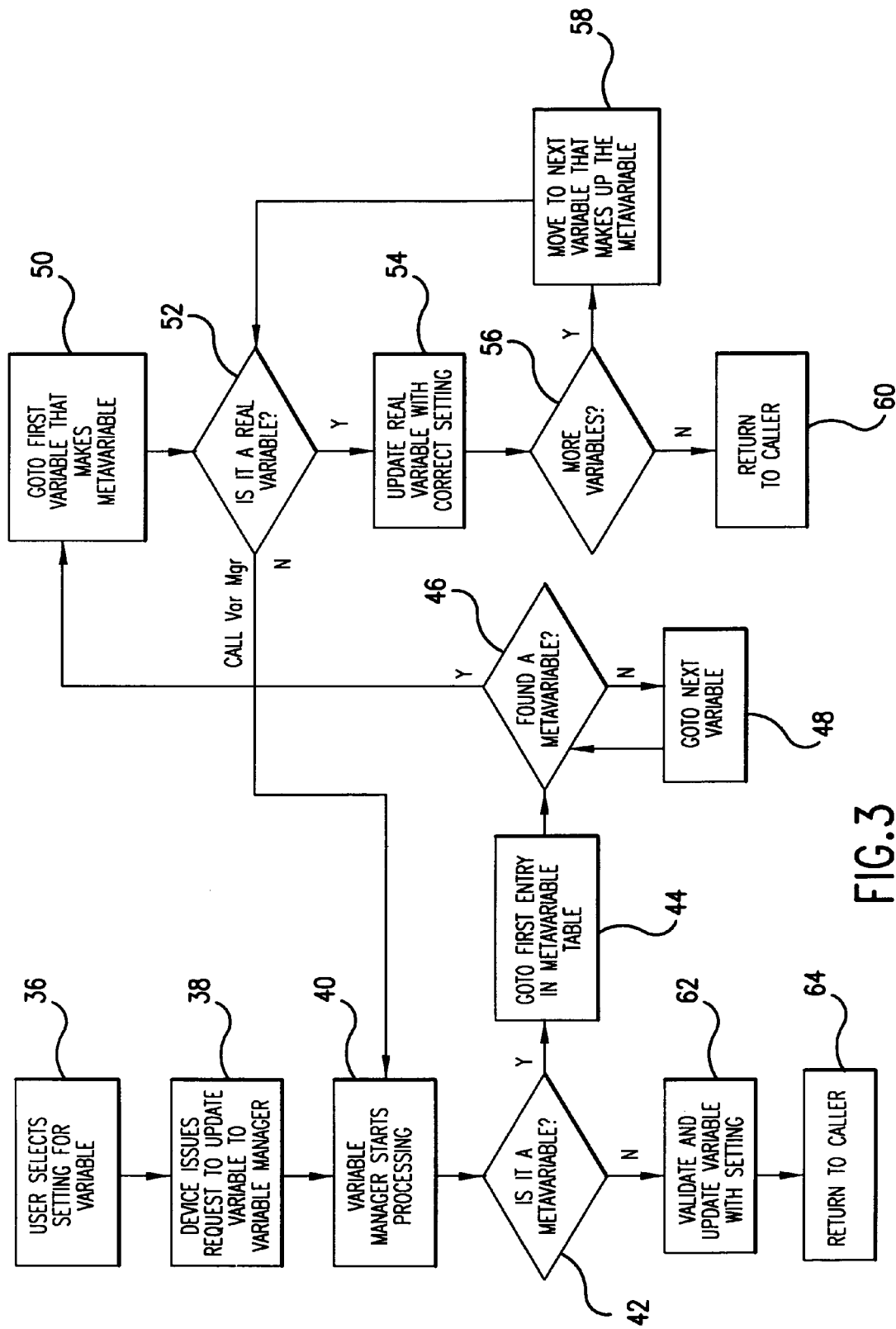
FIG. 3 is a flowchart illustrating the preferred steps of setting a metavariable in a device, such as a printer or host computer.

With reference to FIG. 3, a flowchart illustrating the preferred steps of setting a metavariable in a device, such as a printer or host computer, is shown. The user selects a setting for a specific metavariable, shown as step 36, and then the device issues a request on the processor to update the variable, step 38, with the request sent to the variable manager 20 (FIG. 2). The variable manager 20 starts to process the request in the device, shown at step 40. It is then determined if the requested update is a metavariable, shown by decision 42. If the update is for a metavariable, then the process continues to first entry in the metavariable table, shown at step 44, where the metavariable table is preferably similar to those disclosed in FIG. 1. It is then determined if the metavariable is located in the table(s), shown by decision 46, preferably by a variable-by-variable scan wherein upon the metavariable not being found at decision 46, the process continues to the next variable in the table(s), shown by step 48, and the new variable is then acted upon be decision 46 once again to determine if the metavariable has been found. Such process is alternately implemented in batch, and can be used with a database management system to manage the metavariable and variable tables.

Once the metavariable is located, then the first variable referenced or indicated by the metavariable is processed, shown by step 50, an example of the first variable being the SETTING#1 column of the "Sample" table of FIG. 1. Then it is determined if the referenced variable is a real variable, show as decision 52. If the variable is not a real variable, then the variable is returned for further processing, or to step 40; if the variable is a real variable, the real variable is updated in memory with the correct setting for the specific metavariable, shown by step 54. After updating, it is determined if there are more variables present that are referenced by the metavariable requested updates, shown by decision 56. If there are more variable present, then the next variable of the metavariable is located, shown by step 58, and it is determined if the new variable is a real variable, again at decision 52. Once there are no further variables to update as referenced by the metavariable, then the process returns to the caller, shown at step 60, for further commands.

Referring again to decision 42, if the variable is not a metavariable, the then variable is validated and the variable setting is updated, if necessary, shown at step 62. After the variable is processed, the processor is returned to the user, shown at step 64.

Figure 4:
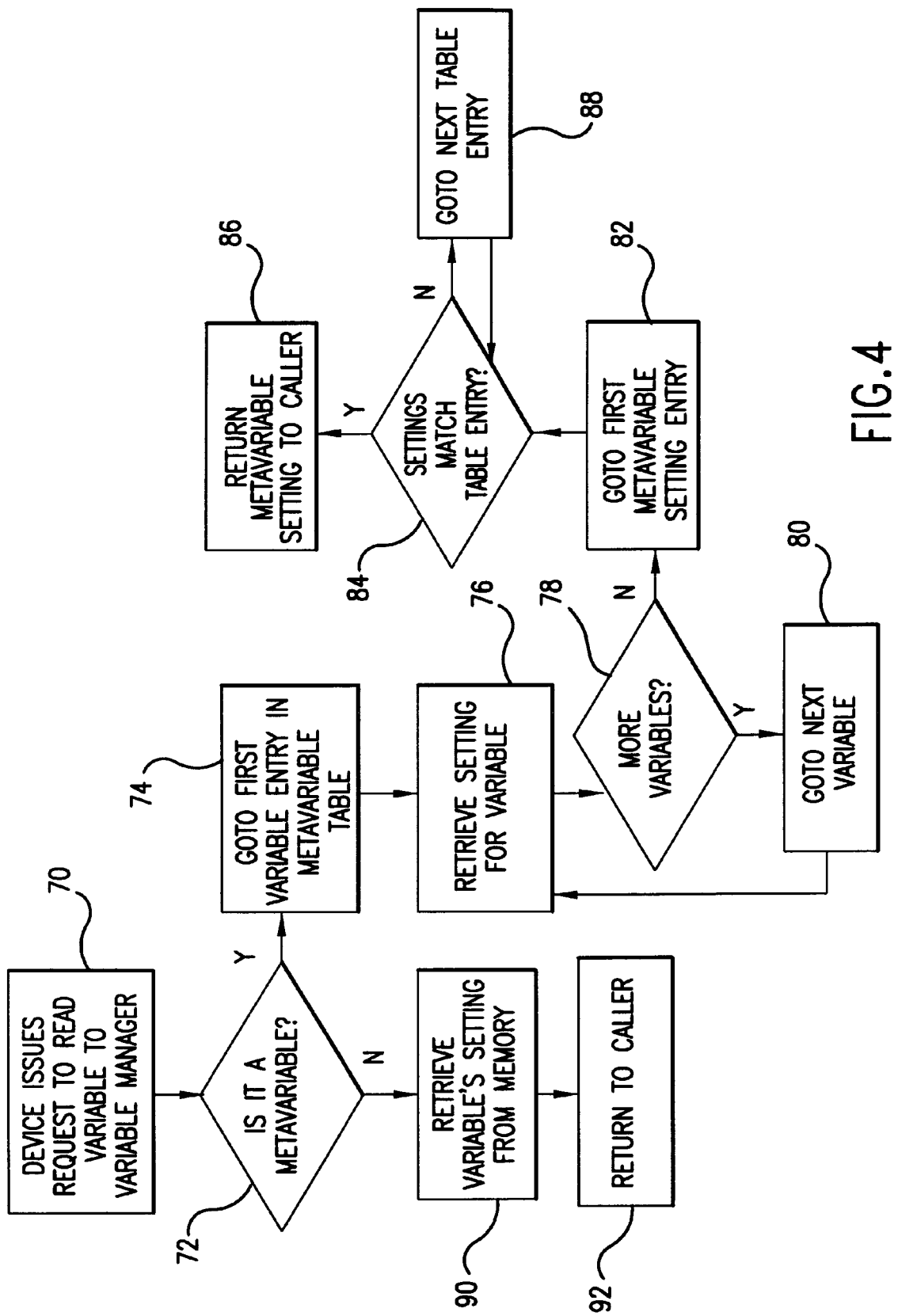
FIG. 4 is a flowchart illustrating the preferred steps of processing a metavariable in a device, such as a printer or host computer.

FIG. 4 is a flowchart illustrating the preferred steps of processing a metavariable in a device, such as a printer or host computer. Upon receipt of the metavariable, which to the device could be a metavariable or a variable, the device reads the metavariable into the variable manager 20, shown by step 70. It is then determined if the variable is a metavariable, shown as decision 72, and if it is determined that the variable is a metavariable, then the process goes to the first entry of the metavariable table, shown at step 74, where the metavariable table is preferably similar to those illustrated in FIG. 1. The first variable setting for the specific metavariable is then retrieved, shown at step 76, and then it is determined if more variables are present, shown by decision 78.

If there are more variables present, then the process goes to the next variable of the list, shown by step 80. If there are no more variables present, then the process goes to the first metavariable setting entry, shown at step 82. It is then determined if the particular settings for the variables that comprise the metavariable match the metavariable entry, shown as decision 84, and if found, the metavariable and its setting (associated variables) are returned to the user or caller, shown at step 86. If the settings do not match the specific table entry at decision 84, then the process goes to the next table entry, shown at step 88.

Referring again to decision 72 determining if the variable is a metavariable, if the variable is not a metavariable, then the variable settings are retrieved from the variable settings memory, shown at step 90. Once the variable settings are retrieved, the process is returned to the user or caller, shown at step 92. It can thus be seen from FIGS. 3 and 4 that the metavariable is treated in the same manner as a variable across the interface, with a metavariable determination step beginning a metavariable processing subroutine upon indication of a metavariable being present.

Figure 5:
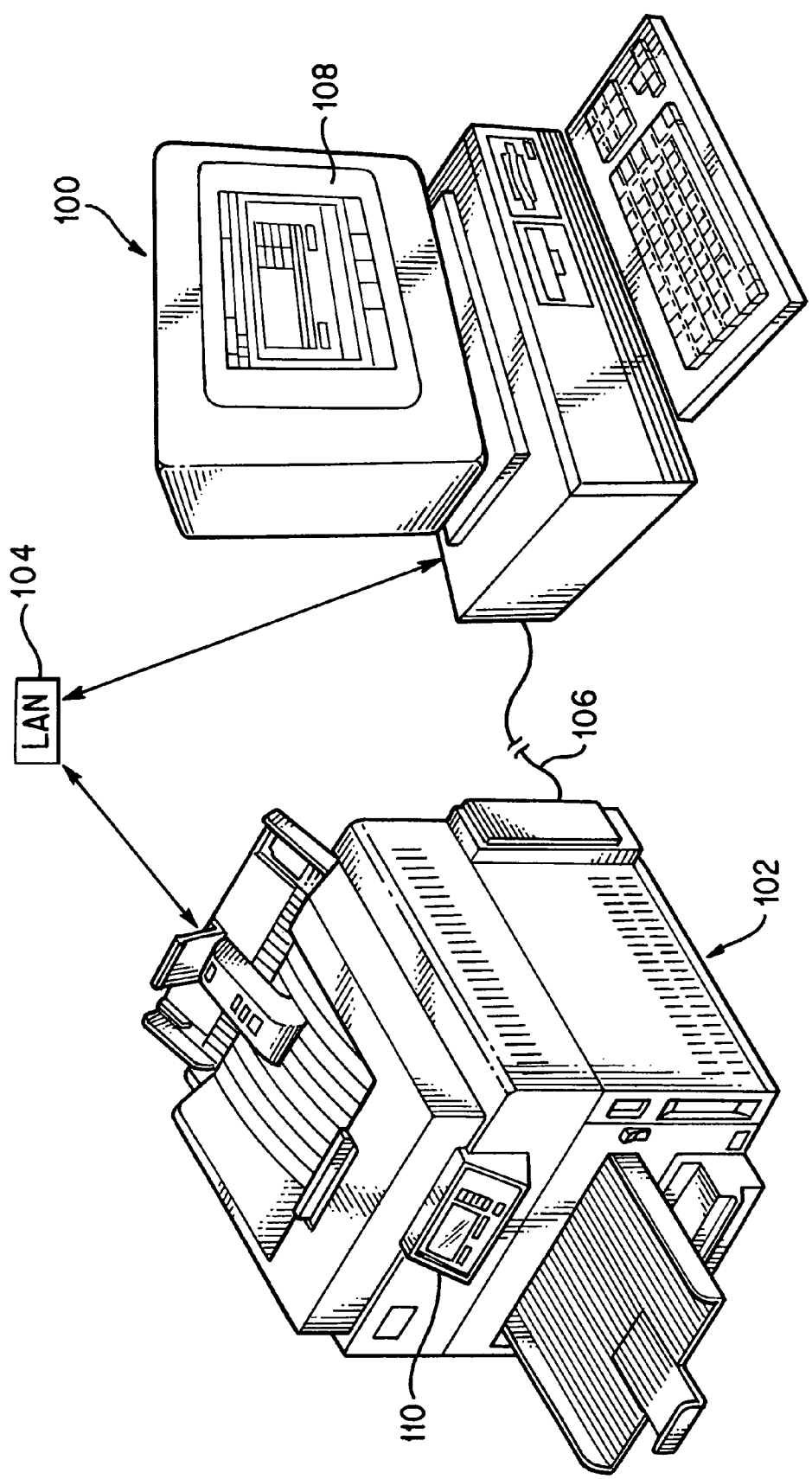
FIG. 5 is a perspective view of a host computer and a peripheral device printer in an interface.

With reference to FIG. 5, a system is illustrated including a host computer and a peripheral device printer that are in a communication interface which implements the steps of the flowcharts of FIGS. 3 and 4. One host computer 100 is shown in an interface with one printer 102, although any number of computers and printer can be in the communication interface. The host computer 100 and 102 printer each have a data store, and preferably have some processing capability. The host computer 100 and 102 are shown in a communication interface with each other either through a local area network (LAN), connection 104, which can also be the Internet, or can be directly connected to each other, port-to-port, as shown by cable 106.

The host computer 100 and printer 102 interface with each other and both send and receive datastreams preferably including at least one metavariable as set forth above. The metavariable can data indicative of the configuration and settings of the printer which are sent to the host computer 100 and can be displayed to the user at display 108. Display 108 is preferably a virtual control panel with a graphic display similar to the control panel 110 of the printer 102. Further, the virtual control panel of display 108 can display the conceptual settings for the printer 102 such that a user is able to request a change at the virtual control panel for a conceptual setting of the printer 102 and a command metavariable is transmitted from the host computer 100 to the printer 102 to effectuate the requested change. Likewise, the metavariable is a command sent from the host computer 100 to the printer 102 to change a configuration or setting of the printer, either permanently or for a specific print job. Such command can be illustrated in a control panel 110 of the printer 102, and alternately, the control panel 110 can display the internal metavariable for the printer 102 to a user, if so embodied.

The printer 102 further illustrates the use of inventive metavariable use between two subsystems within the same device that communicate to each other and use the common data store. The code of the control panel 110 and the variable manager 20 accordingly communicate on the same computer platform. A command metavariable can be entered at the control panel 110 and be processed at the variable manager 20 to effectuate a change in one or more native variables of the printer 102. In like manner, upon inquiry at the control panel 110, the variable manager 20 can generate a metavariable indicative of one or more parameters of the printer 102 for display at the control panel 110. Therefore, ongoing processes on the same device can communicate through the use of metavariables.

In another embodiment, the metavariables can be used between two processes executing on the same device having one processor (CPU) that divides processor time between tasks where the processor includes a common data store for the programs executing thereupon, such as programs executing upon a Windows operating system. As an example, one process can be executing to update a touch screen VGA display similar to control panel 110, while another process is occurring from an active print job on the device. Thus, in such example, two separate programs are executing on the printer. The VGA panel and the printer portion of the device can communicate to each other using NPAP metavariables as embodied herein. Consequently, in such embodiment, the metavariable(s) is being transmitted from process to process, and not from device to device.

The present inventive self-descriptive device interface system and metavariables accordingly provide an inventive method of communication between two or more devices having a data store and a processor, such as host computer 100 and printer 102, which are in an interface. The method includes the step of generating a metavariable in a transmitting device where the metavariable is indicative of at least two or more parameters of a device, such as a metavariable is indicative of print quality in the printer 102. The method then includes the steps of transmitting the metavariable to one or more other receiving devices through the communication interface, such as sending the print quality metavariable (the example shown in FIG. 1) from the printer 102 to the host computer 100, and then receiving the metavariable at a receiving device (such as host computer 100). The method then includes the step of processing the metavariable in the receiving device for evaluation of action required in response to receipt of the metavariable, such as processing the print quality metavariable on the host computer 100 and then taking the action of display the printer settings at display 108 to the user.

The host computer 100 can likewise use the inventive method to send commands to the printer 102. In such method, the host computer 100 can generate a metavariable for print quality, such as those illustrated in FIG. 1, and transmit the print quality metavariable to the printer 102. The printer then receives the print quality metavariable, processes the print quality metavariable, and alters the printer parameters of print quality, such as DPI and font availability, in response.

The processes executing on the same device, such as the active panel display 110 and printer manager alternately utilize the inventive method and the print job as discussed above. One of the ongoing processes transmits one or more metavariables to the other process over the common data store, such as NVRAM 24, while the programs execute in parallel. The other ongoing process receives the metavariable and manipulates one or more of the native variables or settings of the device. The native variables or settings can even be common to the ongoing processes, such as a metavariable indicative of a paper jam being sent from a print job process to the control panel 110 for display.

While there has been shown the preferred and alternate embodiments of the present invention, it is to be understood that certain changes can be made in the forms and the arrangement of the elements and in the steps of the inventive method without departing from the spirit and scope of the invention as set forth in the Claims appended herewith.

What is claimed is:

1. An interface between two or more devices each having a data store, wherein each device is in communication with one or more of the other devices, said interface being configured to generate a datastream including at least one metavariable, said metavariable being indicative of two or more parameters of at least one of the devices, and said datastream occurring between the data store of one transmitting device and the data store of one or more receiving devices such that the metavariable is transmitted from said one transmitting device to said one or more receiving devices, wherein at least one of the parameters defines one or more rendering characteristics to be applied to a print job, wherein the metavariable is treated as a single variable containing data cumulative of variables for each parameter, and wherein said metavariable is defined by a metavariable table including at least one metavariable setting and two or more variable settings corresponding to each said at least one metavariable setting.

2. The interface of claim 1, wherein said metavariable is data indicative of the configuration and settings of the transmitting device.

3. The interface of claim 1, wherein said metavariable is data indicative of the configuration and settings of the receiving device.

4. The interface of claim 1, wherein said metavariable is a command altering two or more settings of the receiving device upon receipt of said metavariable by the receiving device.

5. The interface of claim 1, wherein said metavariable is data indicative of two or more application settings of the transmitting device.

6. The interface of claim 1, wherein said metavariable is data indicative of two or more application settings of the receiving device.

7. The interface of claim 1, wherein said interface is between one or more computers and one or more printers, each computer and each printer having a data store.

8. The interface of claim 7, wherein said metavariable is a command to the printer changing two or more settings of the printer.

9. The interface of claim 7, wherein said metavariable is data indicative of the printer settings transmitted by the printer to one or more receiving host computers.

10. A method of communication between two or more devices each having a data store and a processor, each device in a communication interface with one or more of the other devices, the method comprising the steps of:
generating at least one metavariable in a transmitting device, the metavariable being indicative of two or more parameters of at least one of the devices, wherein at least one of the parameters defines one or more rendering characteristics to be applied to a print job, wherein the metavariable is treated as a single variable containing data cumulative of variables for each parameter, and wherein said metavariable is defined by a metavariable table including at least one metavariable setting and two or more variable settings corresponding to each said at least one metavariable setting;
transmitting the metavariable to one or more other receiving devices through the communication interface;
receiving the metavariable at the one or more receiving devices; and
processing the metavariable in the receiving device for evaluation of action required in response to receipt of the metavariable, wherein processing the metavariable includes:
reading the metavariable into a variable manager; and
retrieving and processing each of the variable settings in the metavariable table.

11. The method of claim 10, wherein the steps of generating the metavariable in the transmitting device and transmitting the metavariable are generating the metavariable in a printer and transmitting the metavariable from the printer.

12. The method of claim 11, wherein the steps of receiving the metavariable at the receiving device and processing the metavariable are receiving and processing the metavariable at a host computer.

13. The method of claim 10, wherein the steps of generating the metavariable in the transmitting device and transmitting the metavariable are generating the metavariable in a host computer and transmitting the metavariable from the host computer.

14. The method of claim 13, wherein the steps of receiving the metavariable at the receiving device and processing the metavariable are receiving and processing the metavariable at a printer.

15. The method of claim 10, wherein the step of transmitting the metavariable to one or more other devices is transmitting the metavariable that is a command to alter two or more parameters of the receiving device.

16. The method of claim 10, wherein the step of transmitting the metavariable to one or more other devices is transmitting the metavariable that is data indicative of the configuration and settings of the transmitting device.

17. A system for providing a communication interface between a plurality of devices, said system comprising:
a transmitting device having a first data store, said transmitting device having two or more parameters associated therewith;
at least one receiving device having a second data store, said receiving device having two or more parameters associated therewith;
wherein said transmitting device transmits a data stream from said first data store to said second data store of said receiving device, said data stream including at least one metavariable, said metavariable being indicative of the two or more parameters of either said transmitting device or said receiving device;

wherein at least one of the parameters defines one or more rendering characteristics to be applied to a print job, and wherein the metavariable is treated as a single variable containing data cumulative of variables for each parameter, and wherein said metavariable is defined by a metavariable table including at least one metavariable setting and two or more variable settings corresponding to each said at least one metavariable setting; and wherein at least one of the transmitting device and the receiving device include a variable manager configured to process variables including the metavariable.

18. The system of claim 17, wherein said metavariable is data indicative of two or more configurations and settings of the transmitting device.

19. The system of claim 17, wherein said metavariable is data indicative of two or more configurations and settings of the receiving device.

20. The system of claim 17, wherein said metavariable is a command altering two or more settings of the receiving device upon receipt of said metavariable by the receiving device.

21. The system of claim 17, wherein said metavariable is data indicative of two or more application settings of the transmitting device.

22. The system of claim 17, wherein said metavariable is data indicative of two or more application settings of the receiving device.

23. The system of claim 17, wherein one of said transmitting device and said receiving device is a host computer, and the other of said transmitting device and said receiving device is a printer.

24. The system of claim 23, wherein said metavariable is a command from a transmitting host computer to a receiving printer, said metavariable changing two or more settings of the printer.

25. The system of claim 23, wherein said metavariable is data indicative of the printer settings, said metavariable transmitter by a transmitting printer to one or more receiving host computers.

26. An interface between two or more processes occurring upon a device having at least one data store, each process in communication with one or more of the other processes, through the data store(s) of the device, said interface being configured to generate a datastream including at least one metavariable, said metavariable being indicative of one or more parameters of the device, and said datastream occurring between one transmitting process and one or more receiving processes such that said metavariable is transmitted from said one transmitting process to said one or more receiving processes, wherein at least one of the parameters defines one or more rendering characteristics to be applied to a print job, wherein the metavariable is treated as a single variable containing data cumulative of variables for each parameter, and wherein said metavariable is defined by a metavariable table including at least one metavariable setting and two or more variable settings corresponding to each said at least one metavariable setting.

27. The interface of claim 26, wherein said metavariable is data indicative of the configuration and settings of the device.

28. The interface of claim 26, wherein said metavariable is data indicative of one or more application settings of the device.

29. The interface of claim 26, wherein said metavariable is a command altering one or more settings of the device upon receipt of said metavariable by the receiving process.

* * * * *